United States Patent [19]

Knechtel et al.

[11] E Re. 29,187

[45] Reissued Apr. 19, 1977

[54] COPYING APPARATUS

[75] Inventors: Wilhelm Knechtel, Biebertal; Gerhard Petersdorf, Pohlheim, W-Stg.; Winfried Sandner, Rechtenbach, all of Germany

[73] Assignee: Canon Kabushiki Kaisha, Tokyo, Japan

[22] Filed: June 25, 1975

[21] Appl. No.: 590,148

Related U.S. Patent Documents

Reissue of:

[64] Patent No.: 3,741,646
Issued: June 26, 1973
Appl. No.: 225,483
Filed: Feb. 11, 1972

[30] Foreign Application Priority Data

Feb. 16, 1971 Germany ..... 2107321

[52] U.S. Cl. ..... 355/51; 355/8

[51] Int. Cl.[2] ..... G03B 27/50

[58] Field of Search ..... 355/8, 50, 51, 64, 65

[56] References Cited

UNITED STATES PATENTS

| | | | |
|---|---|---|---|
| 3,510,218 | 5/1970 | Limberger | 355/51 |
| 3,728,015 | 4/1973 | Opravil | 355/8 |
| 3,740,133 | 6/1973 | Komori et al. | 355/8 |

*Primary Examiner*—L. T. Hix
*Assistant Examiner*—Kenneth C. Hutchison
*Attorney, Agent, or Firm*—Fitzpatrick, Cella, Harper and Scinto

[57] ABSTRACT

A copying apparatus in which thin or thick originals such as individual sheets or thick books are selectively driven over an illumination slit aperture, characterized by a transparent book support such as a glass plate connected to a known transport mechanism for individual sheets such as a pair of transport rolls. The book support is located on the extension of the transport mechanism, and the transport mechanism and the book support are selectively movable together.

24 Claims, 2 Drawing Figures

COPYING APPARATUS

Matter enclosed in heavy brackets [ ] appears in the original patent but forms no part of this reissue specification; matter printed in italics indicates the additions made by reissue.

BACKGROUND OF THE INVENTION

1. Field of the Invention

This invention relates to a copying apparatus in which two- or three-dimensional originals such as individual sheets or thick books are selectively driven over an illumination slit aperture.

2. Description of the Prior Art

In the copying apparatus of the described type, the slit aperture is projected, for example, on a drum carrying photosensitive paper thereon. The speed of rotation of the drum is made equal to the speed at which the originals are moved over the slit aperture. The images of the originals guided over the slit aperture are successively exposed onto the photosensitive paper on the drum. Thereafter, the photosensitive paper can be developed in a subsequent developing device in a known manner.

Such a copying apparatus has an advantage that both individual sheets and desired book pages can be copied. However, the operation of such apparatus is troublesome because the original is usually placed on a glass plate which is movable over the slit aperture, which glass plate must be covered in order not to dazzle the user. Accordingly, to position the original, a cover or a flap cover must first be opened so that the original can be placed on the glass plate, whereafter the cover or the flap cover must be shut again. The same procedures are required to remove the original. In addition, the original must be placed within a predetermined field on the glass plate in accordance with its size, so that copying with such apparatus is troublesome and time-consuming.

There is also known a device in which the originals, when they are individual sheets, are directly inserted into a guide groove in the device and gripped by transport rolls so as to move through the device. In this case, one can successively introduce individual sheets as originals into the device, thereby enabling quick and simple copying to take place. However, this device does not permit copies of books to be obtained.

Accordingly, it has already been proposed that for copies of individual sheets, two sets of transport rolls be used to guide the sheets over the illumination slit aperture and that for copies of desired book pages, the upper rolls of the transport mechanism for individual sheets be detachably arranged and a glass plate with a book resting thereon be guided by utilizing the remaining lower transport rolls of the transport mechanism. The remaining lower transport rolls are frictionally engageable with the glass plate to ensure the automatic transport thereof.

This arrangement has the disadvantages that, to obtain copies of books, part of the apparatus must be detached to change the construction thereof and, moreover, the detached apparatus part must be placed somewhere else during copying.

SUMMARY OF THE INVENTION

The object of the invention is to provide a novel copying apparatus which enables both two-dimensional and three-dimensional originals such as individual sheets or book pages to be copied without changing the arrangement of the apparatus in any way while maintaining simplicity and quickness of the copying, and particularly permits individual sheets used as originals, to be continuously introduced into the apparatus.

Such object of the present invention can be achieved by a copying apparatus of the type described at the beginnning hereof in which a transparent book support, preferably in the form of a glass plate, is connected to a known transport mechanism for individual sheets, preferably in the form of a pair of transport rolls, the book support being located on the extension of the transport mechanism for individual sheets, and the transport mechanism for individual sheets and the book support being selectively movable together.

According to the construction of the present invention, individual sheets are guided for copying to the transport rolls, which move the sheets to pass over the illumination slit aperture. Thus it is possible to introduce the successive sheets continuously into the apparatus as in the aforesaid known system. In this case, the transport mechanism and the book support remain stationary in their positions.

When certain pages of a book are to be copied, the book is opened and placed on the glass plate, then the transport mechanism for individual sheets is moved together with the book support so that the glass plate with the book thereon is guided over the illumination slit aperture.

In a preferred embodiment of the present invention, the book support can also serve as guide to insert individual sheets into a first set of transport rolls.

The common movement of the transport mechanism and the book support can be accomplished mechanically. However, such construction requires an additional cost, so that in a preferred embodiment of the present invention, therefore, the book support and the transport mechanism for individual sheets are arranged so as to be manually movable.

In this case, care must be taken so that the speed of such movement may be in accord with the speed of rotation of the drum, for example, because the image of the original would otherwise be distorted. In order to achieve this, according to another preferred embodiment of the present invention, the transport mechanism for individual sheets is designed so that it is driven by a motor which in turn acts as a braking device for limiting the speed of the book support which is manually movable.

In the construction of this preferred embodiment, operation is effected as follows: If the book support is moved too fast, a free wheel will form a rigid connection between the book support and a chain driven by the drive motor when a predetermined limit speed is reached. In other words, if this limit speed is exceeded, the motor will brake the pressure manually applied to the book support. This brake force is clearly sensed by the user so that it becomes very easy for the user to exactly maintain the limit speed determined by the motor when he displaces the book support. Conversely, when the user displaces the book support too slowly, he can also sense the drop of the speed because of a drop in the braking resistance.

The free-wheel arrangement has the advantage that the book support after copying can be brought back to its start position without any restraint.

The drive motor for the free wheel may advantageously be used to drive the transport mechanism for individual sheets via the chain. Therefore, it is possible to move the image-receiving drum, the transport mechanism for individual sheets and the free wheel for moving the book support in synchronism. Conveniently, the chain of the drive motor for driving the transport mechanism for individual sheets may be engaged with the drive gear of the free wheel at the same time.

Preferably, the shaft for the free wheel is fixedly mounted to the book support.

According to still another embodiment of the present invention, the aforesaid free wheel may be replaced by a coupling. With the aid of this coupling, automatic movement of the book support can be effected. In decoupled position, individual sheets are copied and the return of the book support is accomplished manually.

The book support and the transport mechanism for individual sheets are held in a start position by lock means which preferably function under the action of a spring. A smaller manual pressure on the book support will suffice to permit movement of the book carrier.

BRIEF DESCRIPTION OF THE DRAWINGS

The invention will be described in detail with respect to embodiments shown in the accompanying drawings, in which.

DESCRIPTION OF THE PREFERRED EMBODIMENTS

Figure 1:
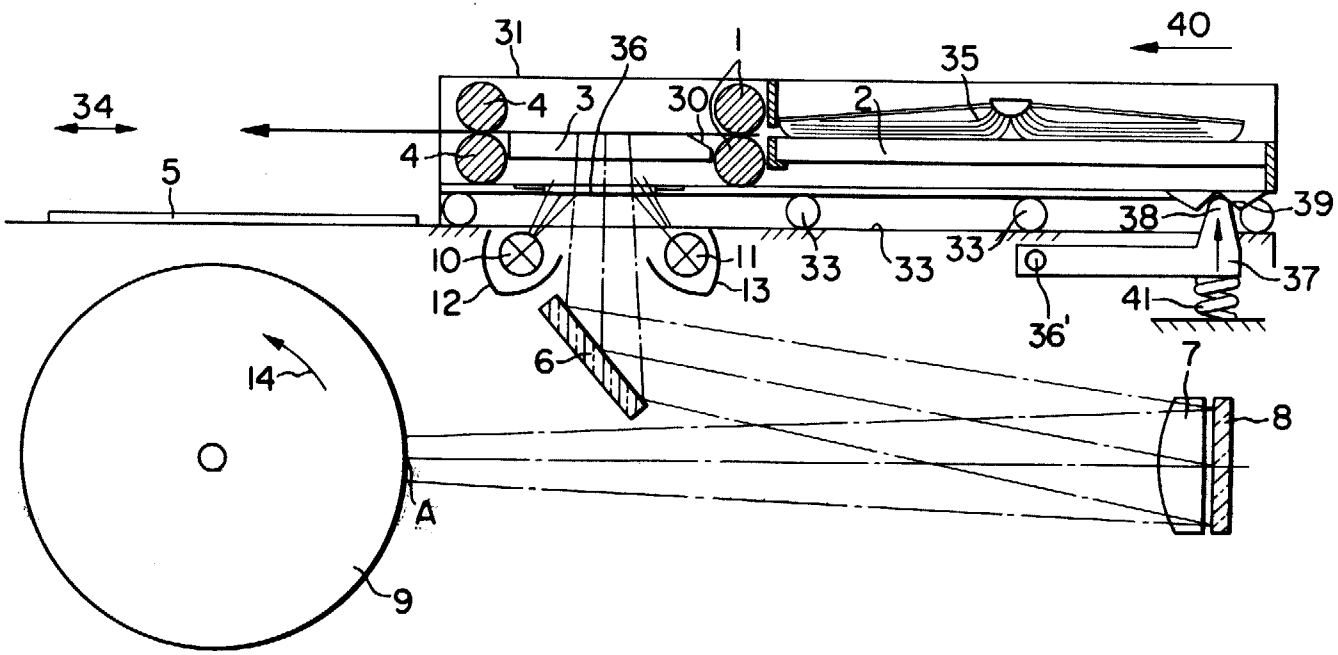
FIG. 1 is a schematic view, in longitudinal section, of the copying apparatus.

Individual sheets to be copied are inserted between a pair of transport rolls 1 from above a glass plate 2. The transport rolls 1 guide the inserted individual sheets over another glass plate 3 to another pair of transport rolls 4, which discharges the originals passed through the transport unit 1, 3, 4 onto a table 5. In the position shown in FIG. 1, the image of the original which moves over the glass plate 3 is projected through a mirror 6, an objective lens 7 and a mirror 8 disposed just behind the objective lens onto a segment A of a drum 9. The illumination of the glass plate 3 and, accordingly, of the original is carried out by two light sources 10 and 11, to which mirrors 12 and 13 are disposed to correspond.

Figure 2:
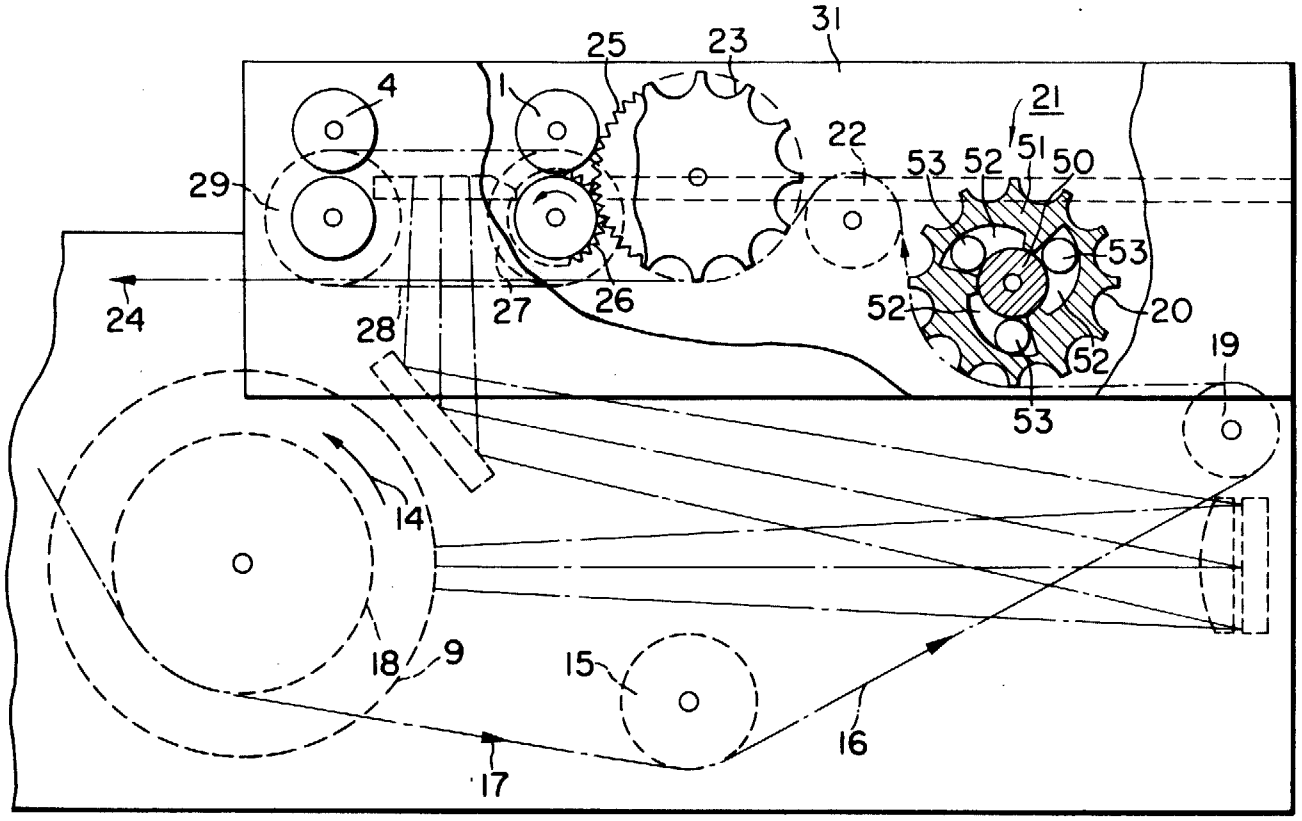
FIG. 2 is a partly cut-away side view of the apparatus.

The drum 9 is rotatable in the direction of arrow 14. The drum 9 is driven by a motor 15 for driving a chain 16 as shown in FIG. 2. The chain 16 is engaged with a gear 18 of the drum and moves in the direction of arrow 17. The chain 16 is further engaged and guided by a readily braked gear 19 fixedly positioned and rotatably mounted in the apparatus. As will be described, along the path of the chain 16, there are further disposed a gear 20 of a free wheel clutch device 21, a tension wheel 22 and a gear 23, via which the chain is guided in the direction of arrow 24. An unshown deflection gear then brings the chain 16 back to the gear 18 of the drum 9, thus driving it in an endless manner. In order to equalize the speed of rotation of the drum 9 to that of movement of the original between the transport rolls 1 and 4, the gear 23 is connected to another gear 25 mounted on the same shaft. This gear meshes with a gear 26. The gear 26 is mounted on the shaft which carries the lower one of the set of transport rolls 1, so as to rotate that particular roll at a reduced speed selected to equal the speed of rotation of the drum 9. Mounted on the shaft of the gear 26 is another gear 27 which is engaged via a chain 28 with a gear 29 for rotating the lower one of another set of transport rolls 4. Thus, the transport rolls 4 at the outlet side are rotated at the same rotational speed as the transport rolls 1 at the inlet side.

In order to permit the inserted individual sheets to move over the glass plate 3 without hindrance, the edge 30 of the glass plate 3 adjacent to the inlet side is downwardly inclined. The transport unit 1, 3, 4, including the first glass plate 2, is housed in a casing 31. The casing 31, having the glass plate 2, transport unit 1, 3, 4 and table 5, is reciprocally movable on a roll track 33 fixedly provided in the apparatus, in the direction of arrow 34. During the movement of the casing, the gears 20, 22 and 23 move on the chain 16.

To copy desired pages of a thick book 35, it is opened at the pages to be copied and placed on the glass plate 2. Then the book is guided over the illumination slit aperture 36 so that the images of the pages to be copied are projected on the drum 9. In the start position shown in FIG. 1, a lever 37 pivotable about the shaft 36' has its projection 38 received in a corresponding groove 39 formed in the casing 31 so that the casing 31 is held in its start position. The movement of the glass plate 2 and the aforesaid transport unit connected thereto is carried out by manually *pushing the glass plate* in the direction of arrow 40. The lever 37 is under the action of a spring 41 so that the projection 38 of the lever is disengaged from the groove 39 simply by pushing the plate slightly.

The free wheel 21 has a shaft 50 fixedly mounted in the casing 31, and on the shaft 50 is seated a wheel 51 which carries the gear 20. The wheel 51 has progressively enlarged cut-outs 52 in which balls 53 are received respectively.

When the glass plate 2 is at rest, the gear 20 is continuously rotated by the moving chain 16. The balls 53 are then in abutment with the widest end portions of the cut-outs so that no rotational movement is applied to the shaft 50. When the glass plate 2 is moved in the direction of arrow 40, the condition described above is maintained as long as the speed of movement of the glass plate is lower than the speed of movement of the chain 16. If the speed of movement of the glass plate 2 reaches the speed level of the chain 16, then the balls 53 are pressed to go toward the narrower ends of the cut-outs 52, thereby creating a rigid connection between the wheels 51 and 50. As the result of such a rigid connection therebetween, the glass plate 2 can not move in the direction of arrow 40 faster than the speed of movement of the chain 16. Thus a braking force is applied at the synchronous speed of the drum 9 and casing 31.

According to the arrangement described above, it is ensured that the glass plate 2 be moved exactly in synchronism with the speed of rotation of the drum 9. When the glass plate 2 with a book thereon is guided over the illumination slit aperture 36 and copying has been completed, the plate 2 can be returned to its start position without any difficulty. During this return movement, the free wheel imparts no brake force to such return motion, because the balls 53 are now again positioned toward the widest end portions of the cut-outs 52.

We claim:

1. Photocopying apparatus comprising a housing, exposure slit means fixedly mounted on said housing, a transparent support member for receiving thereon a thick original to be copied, sheet original transporting means including at least one pair of opposed rollers operable to move a sheet original past said exposure slit means, a casing movably mounted on said housing and having said support member and sheet original *transporting means* fixedly connected thereto wherein said support member can be moved past said exposure slit means, means for releasably holding said casing in a fixed position while said sheet original transporting means operates to move a sheet original past said exposure slit means and for releasing said casing for said movement on said housing when a thick original is to be copied, driving means coupled to one of said opposed rollers to impart rotational movement thereto, and clutch means mounted on said casing and coupled to said driving means for allowing said casing to remain in said fixed position while a sheet original is being copied and to maintain the speed of movement of said casing in synchronism with the speed of movement of said driving means when a thick original is being copied.

2. Photocopying apparatus according to claim 1, wherein said clutch means comprises a shaft fixedly mounted to said casing and means engaging said driving means for free rotation only in one direction with respect to said shaft and being fixed with respect to said shaft to stop the rotation thereof when said casing is moved to copy a thick original.

3. Photocopying apparatus according to claim 2, wherein said driving means includes a chain, and wherein said engaging means comprises a wheel provided to be rotatable around said fixed shaft and having teeth for engaging said chain, said wheel having a plurality of circumferentially extending openings communicating with said shaft and each said opening being tapered at its outer periphery to provide a wide portion and a narrow portion, and a plurality of balls respectively received in said openings to be rotatable at said wide portion while confined to fix said wheel to said shaft at said narrow portion.

4. Photocopying apparatus according to claim 2, wherein said engaging means includes a wheel mounted on said shaft and provided with a gear, and wherein said driving means comprises a chain in mesh with said gear.

5. Photocopying apparatus according to claim 1, wherein said casing is mounted for being manually returned to its said fixed position after completion of its movement.

6. Photocopying apparatus according to claim 1, wherein said transparent support member for said thick original is mounted to provide a guide member for a sheet original inserted into said sheet original transporting means.

7. Photocopying apparatus according to claim 1, wherein said means for releasably holding said casing comprises a projecting member resiliently mounted on said housing, and wherein said casing defines a recessed area for releasably receiving said projecting member.

*8. Photocopying apparatus selectively operable in a first mode for copying relatively thick originals and in a second mode for copying sheet originals, comprising an exposure station through which an original to be copied is to be moved, an optical system for projecting an image of an original moving through said exposure station to an imaging station, means for moving a photosensitive member through said imaging station for the formation of an image of said original thereon, a support carriage capable of supporting relatively thick originals, means for permitting said carriage to be moved along a path such as to carry such originals through said exposure station when the apparatus is operated in the first mode, a sheet conveyor operable to transport sheet originals through said exposure station while said carriage is stationary when the apparatus is operated in the second mode, said sheet conveyor being mounted in tandem with said support carriage and being movable therewith when the apparatus is operated in the first mode, and an endless flexible transmission member engaged with said sheet conveyor for transmitting drive thereto, said transmission member including a portion which extends along said path of movement of said carriage so that, during operation of the apparatus in the first mode, said transmission member remains in engagement with said sheet conveyor.*

*9. Apparatus according to claim 8, wherein said transmission member is a chain.*

*10. Apparatus according to claim 8, wherein said sheet conveyor comprises a pair of transport rollers driven by said transmission member.*

*11. Apparatus according to claim 10, wherein said transmission member is a chain and said sheet conveyor includes a gear wheel engaged with said chain, and means connecting said gear wheel to said transport rollers so that said transport rollers are driven by said chain via said gear wheel.*

*12. Apparatus according to claim 8, wherein said support carriage is arranged to be moved along said path by manual force.*

*13. Apparatus according to claim 12, including coupling means coupling said carriage to said transmission member so that, when said carriage is moved to carry an original through said exposure station during copying in said first mode, the carriage is prevented from being moved faster than said transmission member.*

*14. Apparatus according to claim 13, wherein said coupling means comprises a freewheel device.*

*15. Apparatus according to claim 14, wherein said transmission member is a chain and said coupling means includes a gear engaged with said chain and coupling said chain to said freewheel device.*

*16. Apparatus according to claim 15, including a motor arranged to drive said transmission member and to provide a resistance to movement of the carriage at a speed faster than the speed at which the transmission member is driven by the motor, when the carriage is manually moved during copying in the first mode.*

*17. Apparatus according to claim 8, including means for providing a driving force to said carriage for moving said carriage during operation of the apparatus in the first mode.*

*18. Apparatus according to claim 17, including coupling means for selectively coupling said carriage to said transmission member for the application of said driving force to said carriage, via said transmission member, when the apparatus is operated in the first mode.*

*19. Apparatus according to claim 18, wherein said coupling means is arranged so that said driving force may be applied to said carriage only in the direction in which the carriage is moved during exposure of an original carried thereby, said carriage being arranged to be manu-*

*ally moved in the opposite direction for return to a rest position.*

*20. Apparatus according to claim 8, wherein said transmission member is also coupled to said means for moving a photosensitive member for effecting operation thereof.*

*21. Apparatus according to claim 8, including a lock mechanism for maintaining said carriage in a stationary position during operation of the apparatus in the second mode.*

*22. Apparatus according to claim 21, wherein said lock mechanism comprises a member biassed into locking engagement with said carriage but arranged to become disengaged therefrom when a force is applied to the carriage for effecting movement thereof.*

*23. Apparatus according to claim 8, wherein said sheet conveyor is arranged so that sheet originals may be guided thereinto by using an original support surface of said carriage as a guide surface.*

*24. Photocopying apparatus selectively operable in a first mode for copying relatively thick originals and in a second mode for copying sheet originals, comprising an exposure station through which an original to be copied is to be moved, an optical system for projecting an image of an original moving through said exposure station to an imaging station, means for moving a drum adapted to carry a photosensitive member through said imaging station for the formation of an image of said original thereon, a support carriage capable of supporting relatively thick originals, means for permitting said carriage to be moved along a path such as to carry such originals through said exposure station when the apparatus is operated in the first mode, a sheet conveyor operable to transport sheet originals through said exposure station while said carriage is stationary when the apparatus is operated in the second mode, said sheet conveyor being mounted in tandem with said support carriage and being movable therewith when the apparatus is operated in the first mode, and a transmission means engaged with said sheet conveyor for driving same while allowing said casing to remain stationary when said apparatus is operated in said second mode and to maintain the speed of movement of said casing in synchronism with the speed of movement of said photosensitive member during operation of said apparatus in the first mode, said transmission means remaining in engagement with said sheet conveyor during operation of the apparatus in said first mode.*

* * * * *